United States Patent
Okimoto et al.

(10) Patent No.: US 12,044,569 B2
(45) Date of Patent: Jul. 23, 2024

(54) LIGHT RECEIVING DEVICE AND LIGHT RECEIVING APPARATUS

(71) Applicant: Sumitomo Electric Industries, Ltd., Osaka (JP)

(72) Inventors: Takuya Okimoto, Osaka (JP); Hideki Yagi, Osaka (JP); Takuya Mitarai, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 18/124,952

(22) Filed: Mar. 22, 2023

(65) Prior Publication Data

US 2023/0384155 A1    Nov. 30, 2023

(30) Foreign Application Priority Data

May 30, 2022   (JP) ................. 2022-087460

(51) Int. Cl.
*G01J 1/44*    (2006.01)
(52) U.S. Cl.
CPC ........... *G01J 1/44* (2013.01); *G01J 2001/446* (2013.01)
(58) Field of Classification Search
CPC ...... G01J 1/44; G01J 2001/446; G02B 6/426; G02B 6/4267; G02B 6/4251; H01L 31/02327
See application file for complete search history.

(56) References Cited

U.S. PATENT DOCUMENTS

| | | | |
|---|---|---|---|
| 2012/0141067 A1* | 6/2012 | Sakamaki | H04B 10/60 385/31 |
| 2013/0234006 A1* | 9/2013 | Ogawa | G01J 1/44 250/208.2 |
| 2021/0242268 A1 | 8/2021 | Yagi et al. | |
| 2021/0302671 A1* | 9/2021 | Wall, Jr. | G02B 6/426 |

FOREIGN PATENT DOCUMENTS

JP    2021-120695 A    8/2021

* cited by examiner

*Primary Examiner* — Georgia Y Epps
*Assistant Examiner* — Don J Williams
(74) *Attorney, Agent, or Firm* — Volpe Koenig

(57) ABSTRACT

A light receiving device includes a semiconductor substrate having a first major surface and a second major surface opposite to the first major surface, and a metal pattern layer provided on the second major surface. The first major surface is provided with a first input port configured to receive an input of signal light, a second input port configured to receive an input of local oscillation light, a first light receiving element optically coupled to the first input port, an optical 90 degree hybrid element optically coupled to the first input port and the second input port, and a second light receiving element optically coupled to the optical 90 degree hybrid element. The metal pattern layer contains at least one of titanium or chromium.

18 Claims, 16 Drawing Sheets

LIGHT RECEIVING DEVICE AND LIGHT RECEIVING APPARATUS

CROSS REFERENCE TO RELATED APPLICATIONS

This application claims priority based on Japanese Patent Application No. 2022-087460 filed on May 30, 2022, and the entire contents of the Japanese patent application are incorporated herein by reference.

TECHNICAL FIELD

The present disclosure relates to a light receiving device and a light receiving apparatus.

BACKGROUND

Japanese Unexamined Patent Application Publication No. 2021-120695 discloses a light receiving apparatus, which includes a light receiving device and a carrier. The light receiving device includes a semiconductor substrate. The semiconductor substrate has a first major surface and a second major surface opposite to the first major surface. The first major surface is provided with a first input port configured to receive an input of signal light, a second input port configured to receive an input of local oscillation light, a monitor light receiving element that monitors the magnitude of the signal light, and an optical 90 degree hybrid element. A metal pattern layer is provided on the second major surface. The metal pattern layer includes gold or platinum.

SUMMARY

A light receiving device according to an aspect of the present disclosure includes a semiconductor substrate having a first major surface and a second major surface opposite to the first major surface, and a metal pattern layer provided on the second major surface. The first major surface is provided with a first input port configured to receive an input of signal light, a second input port configured to receive an input of local oscillation light, a first light receiving element optically coupled to the first input port, an optical 90 degree hybrid element optically coupled to the first input port and the second input port, and a second light receiving element optically coupled to the optical 90 degree hybrid element. The metal pattern layer contains at least one of titanium or chromium.

DETAILED DESCRIPTION

Figure 1:
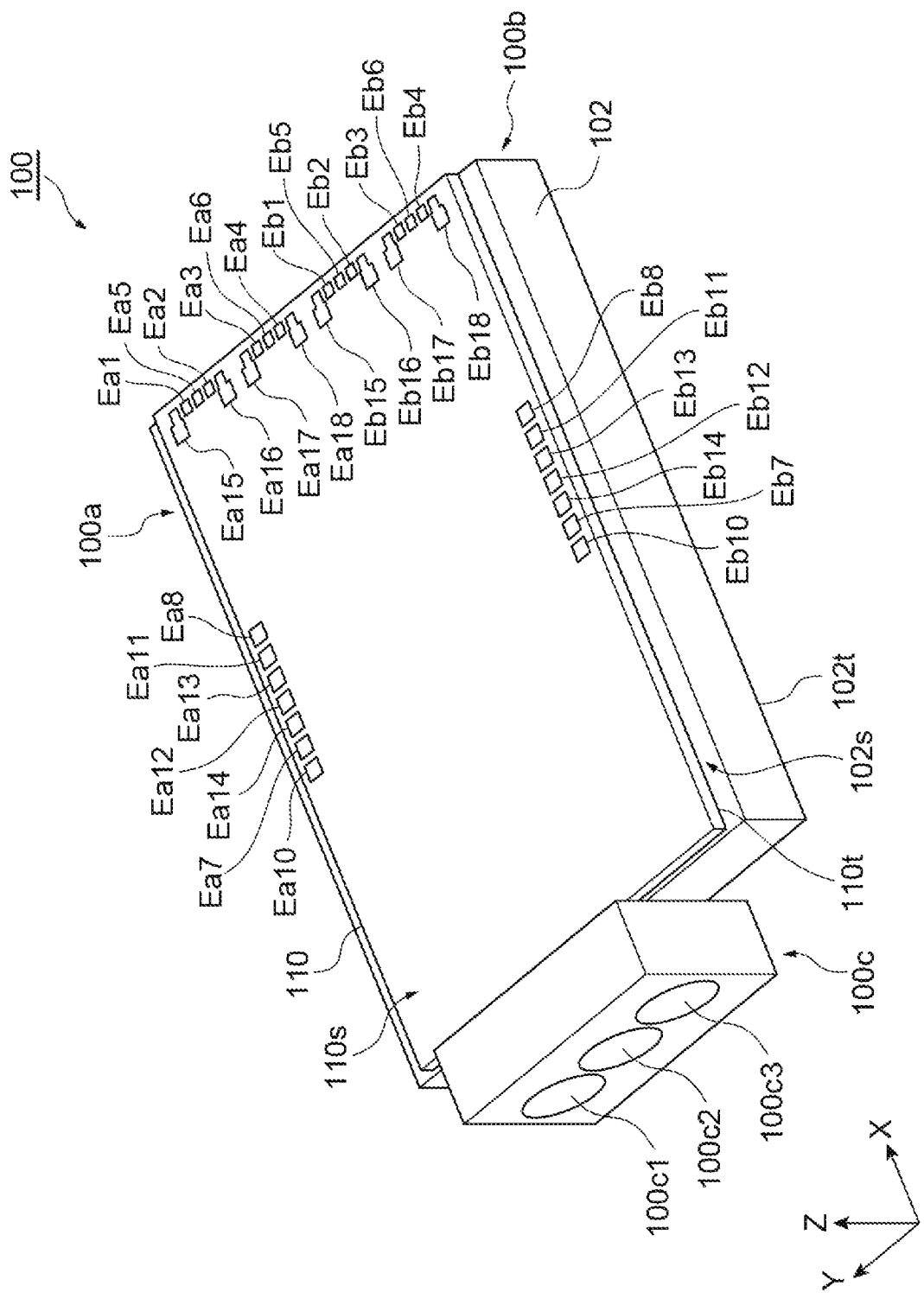
FIG. 1 is a perspective view schematically illustrating a light receiving apparatus according to an embodiment.

Stray light, which is part of the local oscillation light input to the second input port may reach the second major surface through the inside of the semiconductor substrate. In this case, stray light may be reflected by the second major surface and pass through the interior of the semiconductor substrate to reach the monitor light receiving element provided on the first major surface. When stray light reaches the monitor light receiving element, the stray light is detected by the monitor light receiving element, and thus the accuracy of measurement by the monitor light receiving element decreases.

The present disclosure provides a light receiving device and a light receiving apparatus that can reduce the possibility of stray light being detected.

DESCRIPTION OF EMBODIMENTS OF PRESENT DISCLOSURE

First, embodiments of the present disclosure will be listed and explained.

(1) A light receiving device includes a semiconductor substrate having a first major surface and a second major surface opposite to the first major surface, and a metal pattern layer provided on the second major surface. The first major surface is provided with a first input port configured to receive an input of signal light, a second input port configured to receive an input of local oscillation light, a first light receiving element optically coupled to the first input port, an optical 90 degree hybrid element optically coupled to the first input port and the second input port, and a second light receiving element optically coupled to the optical 90 degree hybrid element. The metal pattern layer contains at least one of titanium or chromium.

According to the light receiving device, the signal light and the local oscillation light are input to the optical 90 degree hybrid element. The light output from the optical 90 degree hybrid element is detected by the second light receiving element. The first light receiving element detects a part of the signal light. Here, stray light which is a part of the local oscillation light input to the second input port may reach the second major surface through the inside of the semiconductor substrate. In this case, since the metal pattern layer of the light receiving device has relatively low reflectivity, stray light is difficult to be reflected by the metal pattern layer. Therefore, the possibility that stray light is detected by the first light receiving element can be reduced.

(2) In (1) above, the metal pattern layer may include a portion between the first light receiving element and the second input port as seen from a direction normal to the first major surface. In this case, as seen from the direction normal to the first major surface, it is possible to reduce the possibility that stray light directed from the second input port toward the first light receiving element is detected by the first light receiving element.

(3) In (1) or (2) above, the metal pattern layer may include a first layer and a second layer. The first layer may be disposed between the second layer and the semiconductor substrate. The first layer may contain at least one of titanium or chromium. The second layer may contain gold. In this case, stray light is difficult to be reflected by the first layer. Furthermore, the bonding strength between the second layer and the other member is increased.

(4) In any one of (1) to (3) above, the metal pattern layer may be situated so as not to overlap the optical 90 degree hybrid element as seen from a direction normal to the first major surface. In this case, it is possible to reduce the influence of stress on the optical 90 degree hybrid element, the stress being applied to the semiconductor substrate by the metal pattern layer.

(5) In any one of (1) to (4) above, the second major surface may have an uneven region. In this case, the stray light reaching the second major surface is scattered by the uneven region. Therefore, the possibility that stray light reflected by the second major surface is detected by the first light receiving element can be reduced.

(6) In any one of (1) to (5) above, the first major surface may be provided with a variable optical attenuator optically coupled to the first input port and the optical 90 degree hybrid element. In this case, the light can be attenuated.

(7) A light receiving apparatus includes the light receiving device according to any one of (1) to (6) above and a carrier including a support substrate having a third major surface disposed so as to oppose the second major surface, and a solder pattern layer provided on the third major surface and joined to the metal pattern layer. In this case, the same function and advantageous effect as the (1) above can be obtained.

DETAILS OF EMBODIMENTS OF PRESENT DISCLOSURE

Hereinafter, embodiments of the present disclosure will be described in detail with reference to the accompanying drawings. In the description of the drawings, the same reference numerals are used for the same or equivalent elements, and redundant description is omitted. In the drawings, an XYZ coordinate system is shown as necessary. The X-axis direction (first direction), the Y-axis direction (second direction), and the Z-axis direction intersect (for example, are orthogonal to) each other.

Figure 2:
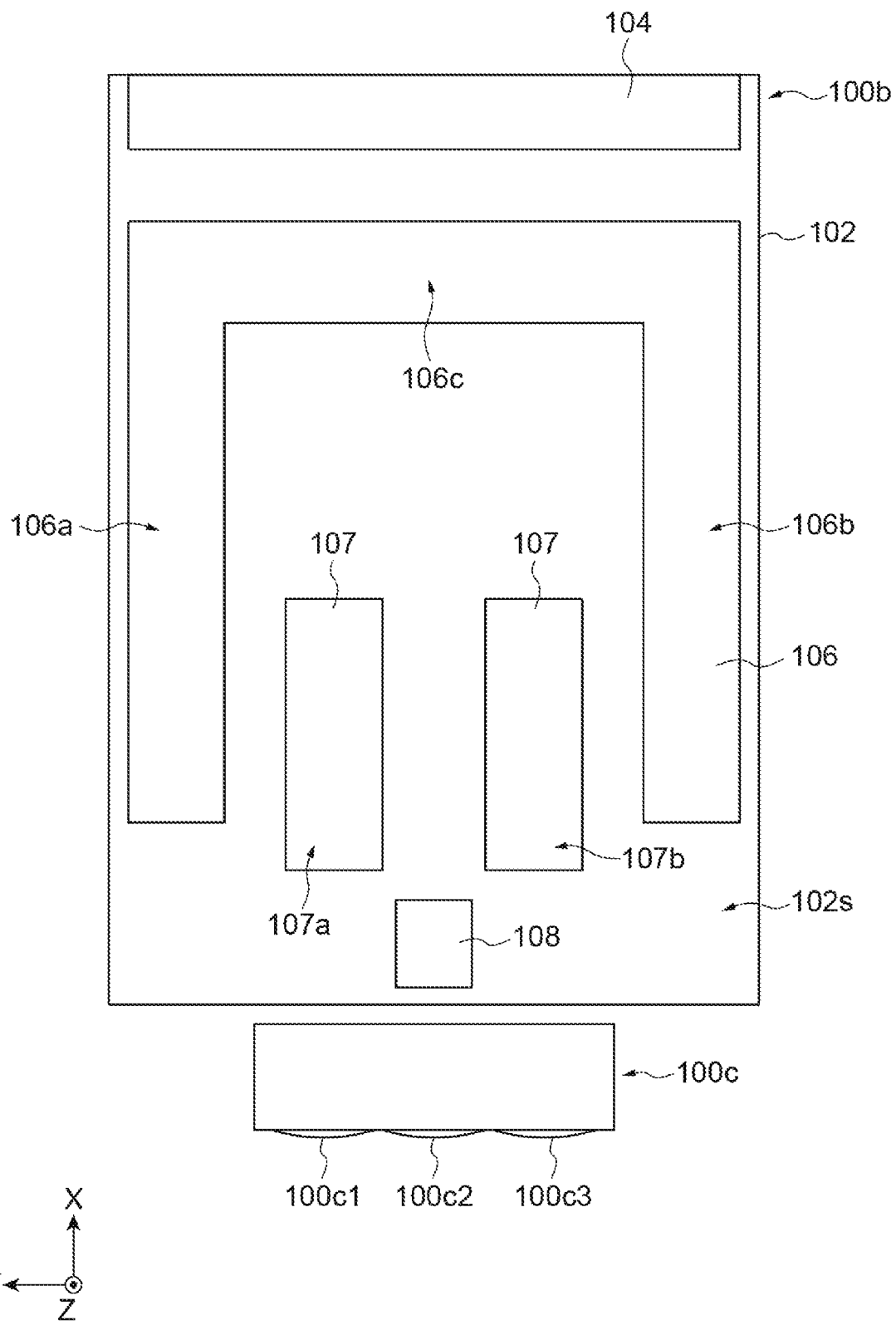
FIG. 2 is a plan view schematically illustrating a carrier and a lens array of a light receiving apparatus according to an embodiment.
Figure 3:
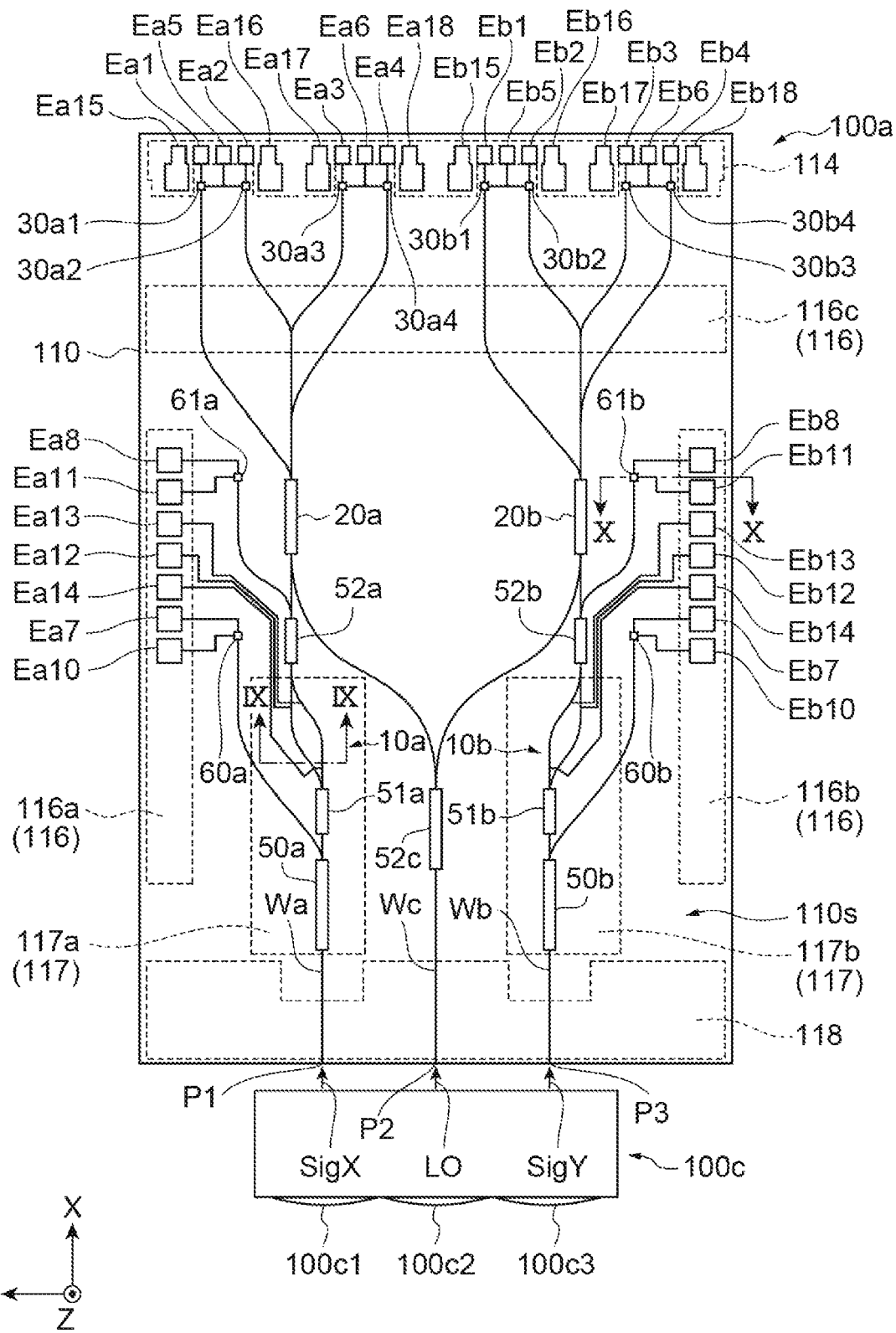
FIG. 3 is a plan view schematically illustrating a light receiving device and a lens array according to an embodiment.
Figure 4:
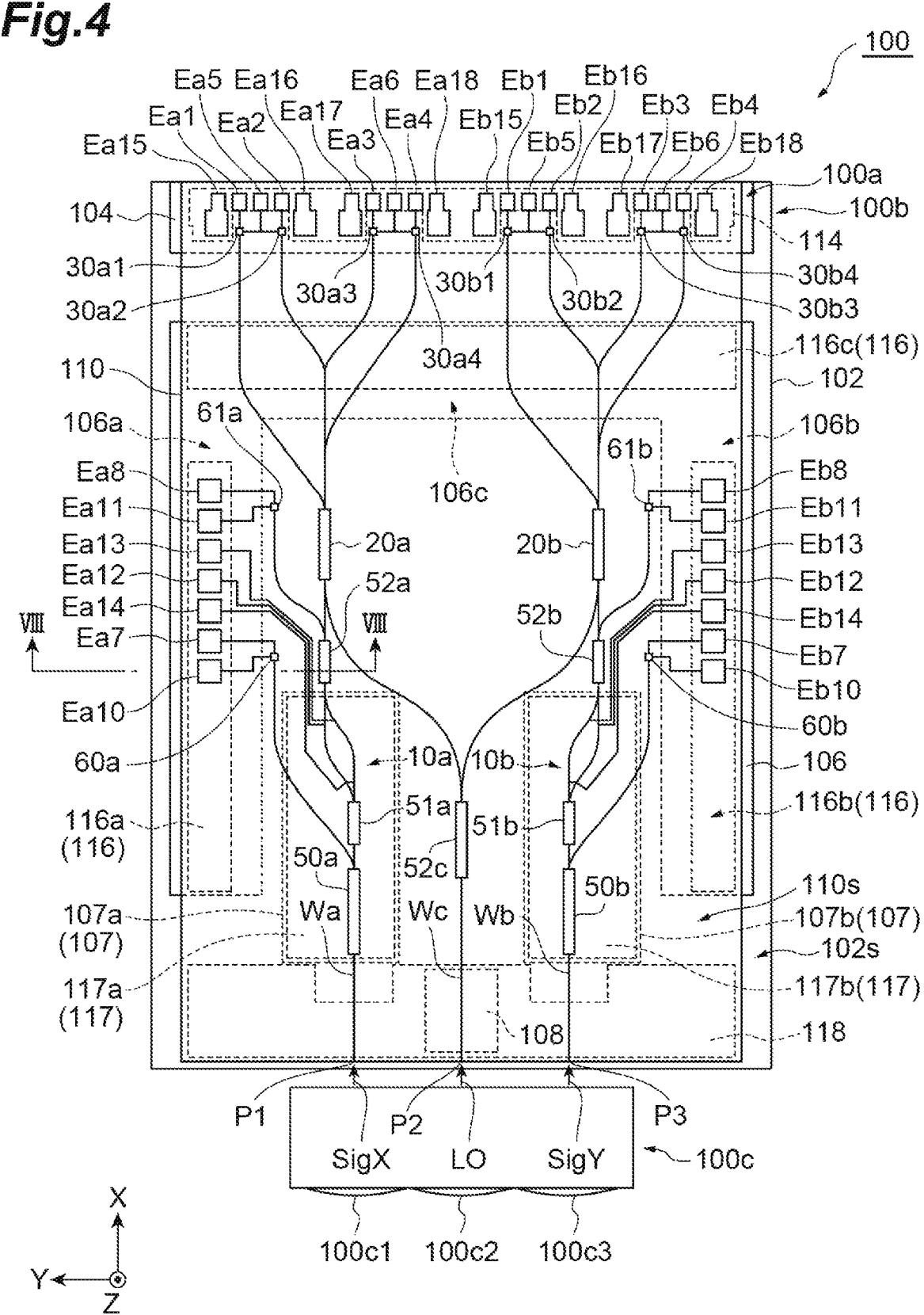
FIG. 4 is a plan view schematically illustrating a light receiving apparatus according to an embodiment.
Figure 5:
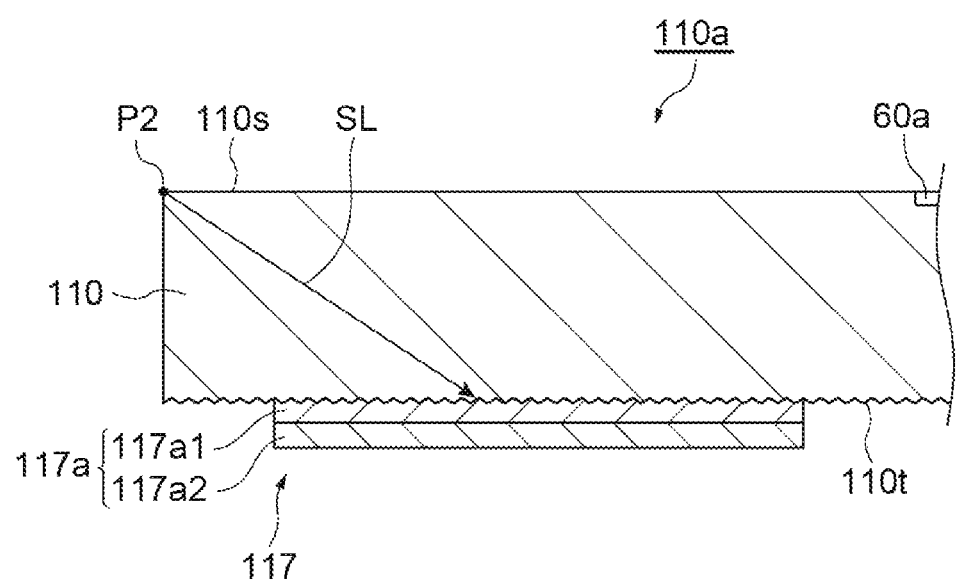
FIG. 5 is a cross-sectional view of a light receiving device according to an embodiment.
Figure 6:
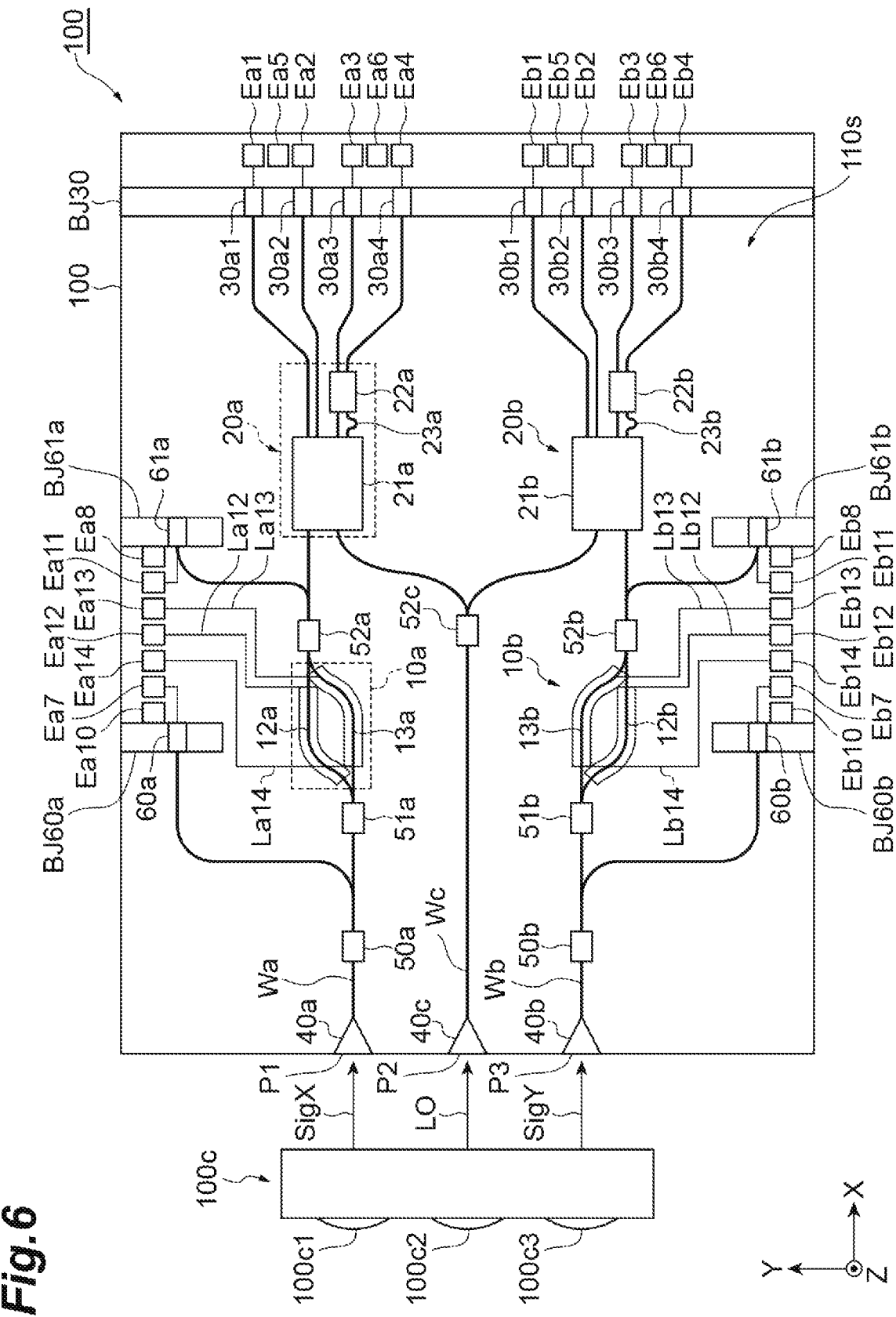
FIG. 6 is a plan view schematically illustrating a light receiving apparatus according to an embodiment.

(Light Receiving Apparatus)
FIG. 1 is a perspective view schematically illustrating a light receiving apparatus according to an embodiment. FIG. 2 is a plan view schematically illustrating a carrier and a lens array of a light receiving apparatus according to an embodiment. FIG. 3 is a plan view schematically illustrating a light receiving device and a lens array according to an embodiment. FIGS. 4 and 6 are plan views schematically illustrating a light receiving apparatus according to an embodiment. FIG. 5 is a cross-sectional view of a light receiving device according to an embodiment.

A light receiving apparatus 100 shown in FIGS. 1, 4, and 6 is used for coherent optical communication, for example.

Light receiving apparatus 100 includes a light receiving device 100a and a carrier 100b. Light receiving device 100a and carrier 100b are arranged along the Z-axis direction. In FIG. 2, light receiving device 100a is omitted. In FIG. 3, carrier 100b is omitted. Light receiving apparatus 100 may include a lens array 100c. Lens array 100c and light receiving device 100a are arranged along the X-axis direction. Lens array 100c includes a plurality of (for example, three) lenses 100c1, 100c2, and 100c3. Lenses 100c1, 100c2, and 100c3 are arranged along the Y-axis direction. Lens 100c2 is disposed between lens 100c1 and lens 100c3.

(Light Receiving Device)
Light receiving device 100a includes a semiconductor substrate 110 having a first major surface 110s and a second major surface 110t opposite to first major surface 110s, and metal pattern layers 114, 116, 117, 118 (see FIG. 3) provided on second major surface 110t. Each of first major surface 110s and second major surface 110t extends in the X-axis direction and the Y-axis direction and has, for example, a rectangular shape. Semiconductor substrate 110 may be a III-V semiconductor substrate, such as an indium phosphide (InP) substrate. The thickness of semiconductor substrate 110 may be from 100 μm to 200 μm.

Metal pattern layers 114, 116, 117, 118 includes at least one of titanium (Ti) or chromium (Cr). Metal pattern layers 114, 116, 117, 118 may include at least one of a Ti layer or a Cr layer. Metal pattern layers 114, 116, 117, 118 may further include at least one of gold (Au) or (Pt).

Hereinafter, the elements integrated on first major surface 110s of light receiving device 100a will be described mainly with reference to FIG. 6.

First major surface 110s may be provided with a plurality of (for example, three) input ports P1, P2, and P3, a plurality of (for example, two) variable optical attenuators (VOAs) 10a and a plurality of (for example, two) optical 90 degree hybrid elements 20a and 20b, and a plurality of (for example, eight) light receiving elements 30a1, 30a2, 30a3, 30a4, 30b1, 30b2, 30b3, and Variable optical attenuators 10a and 10b, optical 90 degree hybrid elements 20a and 20b, and light receiving elements 30a1 to 30a4 and 30b1 to 30b4 are monolithically integrated on first major surface 110s. On first major surface 110s, input port P1, variable optical attenuator 10a, optical 90 degree hybrid element 20a, and light receiving elements 30a1 to 30a4 are arranged in the first direction (X-axis direction). Similarly, on first major surface 110s, input port P3, variable optical attenuator 10b, optical 90 degree hybrid element 20b, and light receiving elements 30b1 to 30b4 are arranged in the X-axis direction.

A plurality of (for example, four) light receiving elements 30a1 to 30a4 (second light receiving elements) are optically coupled to optical 90 degree hybrid element 20a. Optical 90 degree hybrid element 20a is optically coupled to variable optical attenuator 10a. Variable optical attenuator 10a is optically coupled to input ports P1 and P2. Each of the plurality of light receiving elements to 30a4 is connected to optical 90 degree hybrid element 20a by an optical waveguide. Optical degree hybrid element 20a is optically coupled to an optical demultiplexer 52a such as a two input two output multi-mode interference (MMI) coupler. Optical demultiplexer 52a is optically coupled to variable optical attenuator 10a. Variable optical attenuator 10a is optically coupled to optical demultiplexers 50a and 51a such as 1-input 2-output MMI couplers. Optical demultiplexers and 51a are optically coupled to a spot size converter 40a. Spot size converter 40a is situated at an edge of first major surface 110s (an edge extending in the Y-axis direction).

A plurality of (for example, four) light receiving elements 30b1 to 30b4 (second light receiving elements) are optically coupled to optical 90 degree hybrid element 20b. Optical 90 degree hybrid element 20b is optically coupled to variable optical attenuator 10b. Variable optical attenuator 10b is optically coupled to input ports P2 and P3. Each of the plurality of light receiving elements 30b1 to 30b4 is connected to optical 90 degree hybrid element 20b by an optical waveguide. Optical 90 degree hybrid element 20b is optically coupled to an optical demultiplexer 52b such as a 2-input 2-output MMI coupler. Optical demultiplexer 52b is optically coupled to variable optical attenuator 10b. Variable optical attenuator 10b is optically coupled to optical demultiplexers 50b and 51b such as 1-input 2-output MMI couplers. Optical demultiplexers 50b and 51b are optically coupled to a spot size converter 40b. Spot size converter 40b is situated at an edge of first major surface 110s (an edge extending in the Y-axis direction).

Optical 90 degree hybrid elements 20a and 20b are optically coupled to an optical demultiplexer 52c such as 1-input 2-output MIMI coupler. Optical demultiplexer 52c is optically coupled to a spot size converter 40c. Spot size converter 40c is situated at an edge of first major surface 110s (an edge extending in the Y-axis direction). Spot size converter 40c is situated between spot size converter 40a and spot size converter 40b in the Y-axis direction.

Spot size converter 40a functions as input port P1 (first input port) to which a first signal light SigX is input from lens 100c1. Spot size converter 40b functions as input port P3 (first input port) to which a second signal light SigY is input from lens 100c3. Spot size converter 40c functions as input port P2 (second input port) to which a local oscillation light LO is input from lens 100c2. Spot size converters 40a, 40b, and 40c can increase the mode diameter of light.

First signal light SigX is, for example, an X-polarized wave having four different phases and the same wavelength. Second signal light SigY is, for example, a Y-polarized wave having four different phases and the same wavelength. Each of first signal light SigX and second signal light SigY is a signal light modulated by, for example, a Quadrature Phase Shift Keying (QPSK) scheme. Each of first signal light SigX and second signal light SigY is wavelength-multiplexed in a range of wavelengths from 1530 nm to 1570 nm, that is, in a C band in International Telecommunication Union Telecommunication Standardization Sector (ITU-T). Local oscillation light LO has, for example, the same wavelength as each of first signal light SigX and second signal light SigY.

The output terminal of spot size converter 40a is connected to the input terminal of optical demultiplexer 50a by an optical waveguide Wa. The first output terminal of optical demultiplexer 50a is connected to the input terminal of optical demultiplexer 51a by an optical waveguide. A second output end of optical demultiplexer 50a is connected to a light receiving element 60a (first light receiving element) by an optical waveguide. Light receiving element 60a is optically coupled to input port P1. The anode of light receiving element 60a is electrically connected to an electrode pad Ea7, and the cathode of light receiving element 60a is electrically connected to an electrode pad Ea10. Light receiving element 60a monitors the magnitude of first signal light SigX. Light receiving element 60a is, for example, a PIN photodiode. Light receiving element 60a is situated in a region BJ60a which defines a butt-joint bonding.

The first output terminal and the second output terminal of optical demultiplexer 51a are connected to the input terminal of variable optical attenuator 10a by optical waveguides.

Variable optical attenuator 10a is, for example, a Mach-Zehnder optical attenuator. Variable optical attenuator 10a includes heaters 12a and 13a for heating the first and second arm optical waveguides, respectively. Heaters 12a and 13a extend along the first and second arm optical waveguides, respectively. A first end of heater 12a is electrically connected to an electrode pad E12a by a wire La12, and a second end of heater 12a is electrically connected to an electrode pad E14a by a wire La14. A first end of heater 13a is electrically connected to an electrode pad E13a by a wire La13, and a second end of heater 13a is electrically connected to electrode pad E14a by wire La14. The output terminal of variable optical attenuator 10a is connected to the input terminal of optical demultiplexer 52a by an optical waveguide. A first output terminal of optical demultiplexer 52a is connected to a first input terminal of optical 90 degree hybrid element 20a by an optical waveguide. A second output end of optical demultiplexer 52a is connected to a light receiving element 61a (first light receiving element) by an optical waveguide. Light receiving element 61a is optically coupled to input port P1. The anode of light receiving element 61a is electrically connected to an electrode pad Ea11, and the cathode of light receiving element 61a is electrically connected to an electrode pad Ea8. Electrode pad Ea8 and electrode pad Ea11 are electrically connected to a signal processing device (not shown) provided outside light receiving apparatus 100 using wire bonding. When the signal processing device detects the magnitude of the electric signal, the magnitude of first signal light SigX output from variable optical attenuator 10a is indirectly monitored. Light receiving element 61a is, for example, a PIN photodiode. Light receiving element 61a is situated in a region BJ61a defining a butt-joint bonding.

Optical 90 degree hybrid element 20a may include a 2-input 4-output MMI coupler 21a and a 2-input 2-output MMI coupler 22a. The first input terminal of MMI coupler 21a serves as the first input terminal of optical 90 degree hybrid element 20a. The second input terminal of MMI coupler 21a serves as the second input terminal of optical 90 degree hybrid element 20a. Two of the four output terminals of MMI coupler 21a are coupled to two input terminals of MMI coupler 22a by optical waveguides, respectively. The optical path lengths of the optical waveguides are different from each other, and at a phase shift portion 23a, the first optical waveguide is curved away from the second optical waveguide so that the first optical waveguide is slightly longer than the second optical waveguide. As a result, the signal component propagating through the first optical waveguide has a delay corresponding to a phase of 45° with respect to the signal component propagating through the second optical waveguide. The other two output ends of MMI coupler 21a are connected to light receiving elements 30a1 and 30a2 by optical waveguides, respectively. The anode of light receiving element 30a1 is electrically connected to an electrode pad Ea1, and the cathode of light receiving element 30a1 is electrically connected to an electrode pad Ea5. The anode of light receiving element 30a2 is electrically connected to an electrode pad Ea2, and the cathode of light receiving element 30a2 is electrically connected to electrode pad Ea5. Two output ends of MMI coupler 22a are connected to light receiving elements 30a3 and 30a4 by optical waveguides, respectively. The anode of light receiving element 30a3 is electrically connected to an electrode pad Ea3, and the cathode of light receiving element 30a3 is electrically connected to an electrode pad Ea6. The anode of light receiving element 30a4 is electrically connected to an electrode pad Ea4, and the cathode of light receiving element 30a4 is electrically connected to electrode pad Ea6. Electrode pads Ea1 to Ea6 are electrically connected to a transimpedance amplifier (TIA) (not shown) provided outside light receiving apparatus 100 using wire bonding. The TIA detects the electric signal from each light receiving element, thereby detecting the intensity of light entering each of light receiving elements 30a1 to 30a4. Light receiving elements 30a1 to 30a4 are situated in a region BJ30 which defines a butt-joint bonding. Light receiving elements 30a1 to 30a4 are, for example, PIN photodiodes.

Electrode pads Ea15, Ea16, Ea17, and Ea18 may be provided on first major surface 110s. These electrode pads are electrically connected to the ground electrode of the TIA by wire bonding.

The output terminal of spot size converter 40b is connected to the input terminal of optical demultiplexer 50b by an optical waveguide Wb. The first output terminal of optical demultiplexer 50b is connected to the input terminal of optical demultiplexer 51b by an optical waveguide. A second output end of optical demultiplexer 50b is connected to a light receiving element 60b (first light receiving element) by an optical waveguide. Light receiving element 60b is optically coupled to input port P3. The anode of light receiving element 60b is electrically connected to an electrode pad Eb7, and the cathode of light receiving element 60b is electrically connected to an electrode pad Eb10. Light receiving element 60b monitors the magnitude of second signal light SigY. Light receiving element 60b is, for example, a PIN photodiode. Light receiving element 60b is situated in a region BJ60b defining a butt-joint bonding.

The first output terminal and the second output terminal of optical demultiplexer 51b are connected to the input terminal of variable optical attenuator 10b by optical waveguides. Variable optical attenuator 10b is, for example, a Mach-Zehnder optical attenuator. Variable optical attenuator 10b includes heaters 12b and 13b for heating the first and second arm optical waveguides, respectively. Heaters 12b and 13b extend along the first and second arm optical waveguides, respectively. A first end of heater 12b is electrically connected to an electrode pad E12b by a wire Lb12, and a second end of heater 12b is electrically connected to an electrode pad E14b by a wire Lb14. A first end of heater 13b is electrically connected to an electrode pad E13b by a wire Lb13, and a second end of heater 13b is electrically connected to electrode pad E14b by wire Lb14. The output terminal of variable optical attenuator 10b is connected to the input terminal of optical demultiplexer 52b by an optical waveguide. A first output terminal of optical demultiplexer 52b is connected to a first input terminal of optical 90 degree hybrid element 20b by an optical waveguide. A second output end of optical demultiplexer 52b is connected to a light receiving element 61b (first light receiving element) by an optical waveguide. Light receiving element 61b is optically coupled to input port P3. The anode of light receiving element 61b is electrically connected to an electrode pad Eb11, and the cathode of light receiving element 61b is electrically connected to an electrode pad Eb8. Electrode pad Eb8 and electrode pad Eb11 are electrically connected to a signal processing device (not shown) provided outside light receiving apparatus 100 using wire bonding. When the signal processing device detects the magnitude of the electric signal, the magnitude of second signal light SigY output from variable optical attenuator 10b is indirectly monitored. Light receiving element 61b is, for example, a PIN photodiode. Light receiving element 61b is situated in a region BJ61b defining a butt-joint bonding.

Optical 90 degree hybrid element 20b may include a 2-input 4-output MMI coupler 21b and a 2-input 2-output MMI coupler 22b. The first input terminal of MMI coupler 21b serves as the first input terminal of optical 90 degree hybrid element 20b. A second input terminal of MMI coupler 21b serves as a second input terminal of optical 90 degree hybrid element 20b. Two of the four output terminals of MMI coupler 21b are coupled to two input terminals of MMI coupler 22b by optical waveguides, respectively. The optical path lengths of the optical waveguides are different from each other, and at a phase shift portion 23b, the first optical waveguide is curved away from the second optical waveguide so that the first optical waveguide is slightly longer than the second optical waveguide. As a result, the signal component propagating through the first optical waveguide has a delay corresponding to a phase of 45° with respect to the signal component propagating through the second optical waveguide. The other two output ends of MMI coupler 21b are connected to light receiving elements 30b1 and 30b2 by optical waveguides, respectively. The anode of light receiving element 30b1 is electrically connected to an electrode pad Eb1, and the cathode of light receiving element 30b1 is electrically connected to an electrode pad Eby. The anode of light receiving element 30b2 is electrically connected to an electrode pad Eb2, and the cathode of light receiving element 30b2 is electrically connected to electrode pad Eby. Two output ends of MMI coupler 22b are connected to light receiving elements 30b3 and 30b4 by optical waveguides, respectively. The anode of light receiving element 30b3 is electrically connected to an electrode pad Eb3, and the cathode of light receiving element 30b3 is electrically connected to an electrode pad Eb6. The anode of light receiving element 30b4 is electrically connected to an electrode pad Eb4, and the cathode of light receiving element 30b4 is electrically connected to electrode pad Eb6. Electrode pads Eb1 to Eb6 are electrically connected to a transimpedance amplifier (TIA) (not shown) provided outside light receiving apparatus 100 using wire bonding. The TIA detects the electric signal from each light receiving element, thereby detecting the intensity of light entering each of light receiving elements 30b1 to 30b4. Light receiving elements 30b1 to 30b4 are situated in region BJ30 which defines a butt-joint bonding. Light receiving elements 30b1 to 30b4 are, for example, PIN photodiodes.

Electrode pads Eb15, Eb16, Eb17, and Eb18 may be provided on first major surface 110s. These electrode pads are electrically connected to the ground electrode of the TIA by wire bonding.

The output terminal of spot size converter 40c is connected to the input terminal of optical demultiplexer 52c by an optical waveguide Wc. A first output terminal of optical demultiplexer 52c is connected to a second input terminal of optical 90 degree hybrid element 20a by an optical waveguide. A second output terminal of optical demultiplexer 52c is connected to a second input terminal of optical 90 degree hybrid element 20b by an optical waveguide.

According to light receiving device 100a, first signal light SigX input to spot size converter is input to optical 90 degree hybrid element 20a together with local oscillation light LO input to spot size converter 40c. When first signal light SigX and local oscillation light LO interfere with each other in optical 90 degree hybrid element 20a, first signal light SigX is separated into four light components. The four components of light are detected by light receiving elements 30a1 through respectively. Each of the lights detected by light receiving elements 30a1 and 30a2 is an In-Phase component I, and each of the phases of the lights differs from each other by 180°. For example, the phase of the light detected by light receiving element 30*a*1 is 180°, and the phase of the light detected by light receiving element 30*a*2 is 0°. Each of the lights detected by light receiving elements 30*a*3 and 30*a*4 is a Quadrature component Q, of which phase differs from that of the In-Phase component I by 90°, and each of the phases of the lights differs from each other by 180°. For example, the phase of the light detected by light receiving element 30*a*3 is 270°, and the phase of the light detected by light receiving element 30*a*4 is 90°.

Second signal light SigY input to spot size converter 40*b* is input to optical 90 degree hybrid element 20*b* together with local oscillation light LO input to spot size converter 40*c*. When second signal light SigY and local oscillation light LO interfere with each other in optical 90 degree hybrid element 20*b*, second signal light SigY is separated into four light components in the same manner as first signal light SigX. The four components of light are detected by light receiving elements 30*b*1 through 30*b*4, respectively.

Next, metal pattern layers 114, 116, 117, 118 provided on second major surface 110*t* of light receiving device 100*a* will be described with reference to FIGS. 3 and 5.

Metal pattern layer 114 extends along an edge of second major surface 110*t* (an edge extending in the Y-axis direction).

Metal pattern layer 116 may include a pair of third portions 116*a* and 116*b* extending along the X-axis direction, and a fourth portion 116*c* spaced apart from the pair of third portions 116*a* and 116*b*. The pair of third portions 116*a* and 116*b* are spaced apart from each other in the Y-axis direction. Fourth portion 116*c* extends in the Y-axis direction between metal pattern layer 114 and the pair of third portions 116*a* and 116*b*. The arrangement of metal pattern layer 116 may be line-symmetric with respect to a line (not shown) passing through optical demultiplexer 52*c* and extending in the X-axis direction. Since the arrangement of two variable optical attenuators 10*a* and 10*b* are also line-symmetric with respect to the line, even if the stress caused by metal pattern layer 116 affects two variable optical attenuators 10*a* and 10*b*, the influences on variable optical attenuators 10*a* and 10*b* are equal to each other. Thus, the non-uniformity of the characteristics of the two variable optical attenuators is avoided. As fourth portion 116*c* extends in the Y-axis direction, metal pattern layer 116 may have line symmetry as a whole.

Metal pattern layer 117 may include a first portion 117*a* and a second portion 117*b*. First portion 117*a* and second portion 117*b* may be spaced apart from each other in the Y-axis direction. First portion 117*a* may be situated between light receiving element 60*a* and 61*a* and input port P2 as seen from the Z-axis direction (direction normal to first major surface 110*s*). As seen from the Z-axis direction, first portion 117*a* may overlap a line segment connecting light receiving element 60*a* and input port P2 or a line segment connecting light receiving element 61*a* and input port P2. Second portion 117*b* may be situated between light receiving elements 60*b* and 61*b* and input port P2 as seen from the Z-axis direction. As seen from the Z-axis direction, second portion 117*b* may overlap a line segment connecting light receiving element 60*b* and input port P2 or a line segment connecting light receiving element 61*b* and input port P2. Metal pattern layer 117 may not overlap or be separated from optical 90 degree hybrid elements 20*a* and 20*b* and optical demultiplexers 52*a*, 52*b*, and 52*c* as seen from the Z-axis direction. First portion 117*a* may overlap variable optical attenuator 10*a* and optical demultiplexers 50*a* and 51*a* as seen from the Z-axis direction. Second portion 117*b* may overlap variable optical attenuator 10*b* and optical demultiplexers 50*b* and 51*b* as seen from the Z-axis direction.

Metal pattern layer 118 extends along an edge of second major surface 110*t* (an edge extending in the Y-axis direction and opposite to the edge on which metal pattern layer 114 is provided).

Metal pattern layers 116, 117, 118 may be connected to each other to form a single metal pattern layer. In this case, a region between fourth portion 116*c* and metal pattern layer 118 is also covered by the metal pattern layer.

FIG. 5 is a cross-sectional view of light receiving device 100*a* along the Z-axis direction. The cross-section of FIG. 5 passes through input port P2 and light receiving element 60*a* shown in FIG. 3. As shown in FIG. 5, first portion 117*a* of metal pattern layer 117 may include a first layer 117*a*1 and a second layer 117*a*2. First layer 117*a*1 is disposed between second layer 117*a*2 and semiconductor substrate 110. First layer 117*a*1 may include at least one of titanium or chromium. Second layer 117*a*2 may include gold. Second portion 117*b* of metal pattern layer 117 may have the same configuration as first portion 117*a*. Other metal pattern layers 114, 116, 118 may have the same configuration as first portion 117*a*.

Second major surface 110*t* of semiconductor substrate 110 may have an uneven region. The uneven region may be provided in entire second major surface 110*t* or may be provided in a part of second major surface 110*t*. First portion 117*a* and second portion 117*b* of metal pattern layer 117 may be provided on the uneven region. The uneven region may be formed by sputtering.

According to light receiving device 100*a*, a part of local oscillation light LO (a stray light SL in FIG. 5) input to input port P2 may reach second major surface 110*t* through the inside of semiconductor substrate 110. Metal pattern layer 117 of light receiving device 100*a* includes at least one of titanium or chromium. The reflectivity of titanium for light having a wavelength of 1.55 μm is 60% or less. The reflectivity of chromium for light having a wavelength of 1.55 μm is 70% or less. Metal pattern layer 117 has a relatively low reflectivity with respect to light in a wavelength range of 1.5 μm to 1.6 μm. Thus, stray light SL is not easily reflected by first portion 117*a* of metal pattern layer 117. As a result, it is possible to reduce the possibility that stray light SL is detected by light receiving elements 60*a* and 61*a*. Similarly, stray light SL is not easily reflected by second portion 117*b* of metal pattern layer 117. As a result, it is possible to reduce the possibility that stray light SL is detected by light receiving elements 60*b* and 61*b*.

As shown in FIG. 3, when first portion 117*a* is situated between light receiving elements 60*a* and 61*a* and input port P2 as seen from the Z-axis direction, stray light SL directed from input port P2 to light receiving elements 60*a* and 61*a* is not easily reflected by first portion 117*a*. Therefore, it is possible to reduce the possibility that stray light SL is detected by light receiving elements 60*a* and 61*a*. Similarly, when second portion 117*b* is situated between light receiving elements 60*b* and 61*b* and input port P2 as seen from the Z-axis direction, stray light SL directed from input port P2 to light receiving elements 60*b* and 61*b* is not easily reflected by second portion 117*b*. Therefore, it is possible to reduce the possibility that stray light SL is detected by light receiving elements 60*b* and 61*b*.

When second major surface 110*t* of semiconductor substrate 110 has an uneven region, stray light SL reaching second major surface 110*t* is scattered by the uneven region. Therefore, it is possible to reduce the possibility that stray light SL reflected by second major surface 110t is detected by light receiving elements 60a, 61a, 60b, and 61b.

When second layer 117a2 includes gold, the bonding strength between second layer 117a2 and another member (for example, a solder pattern layer 107 of FIGS. 2 and 4) may be increased.

Experimental Example

Hereinafter, an experimental example performed to evaluate light receiving device 100a will be described. The following experimental examples are not intended to limit the present disclosure.

Four samples SM1 to SM4 having the same configuration as light receiving device 100a shown in FIG. 3 were prepared except that metal pattern layer 117 is not provided. Three samples SM5 to SM7 having the same configuration as light receiving device 100a shown in FIG. 3 were prepared except that metal pattern layers 116, 117, 118 are connected to each other to form a single metal pattern layer. The metal pattern layer is a titanium layer.

For samples SM1 to SM7, the current values of leakage light (stray light) detected by light receiving element 60a was measured. The power of local oscillation light LO incident on samples SM1 to SM7 is 1 mW. The voltage applied to light receiving element 60a of samples SM1 to SM7 is −2.5 V (reverse bias). The results are shown in FIG. 7.

Figure 7:
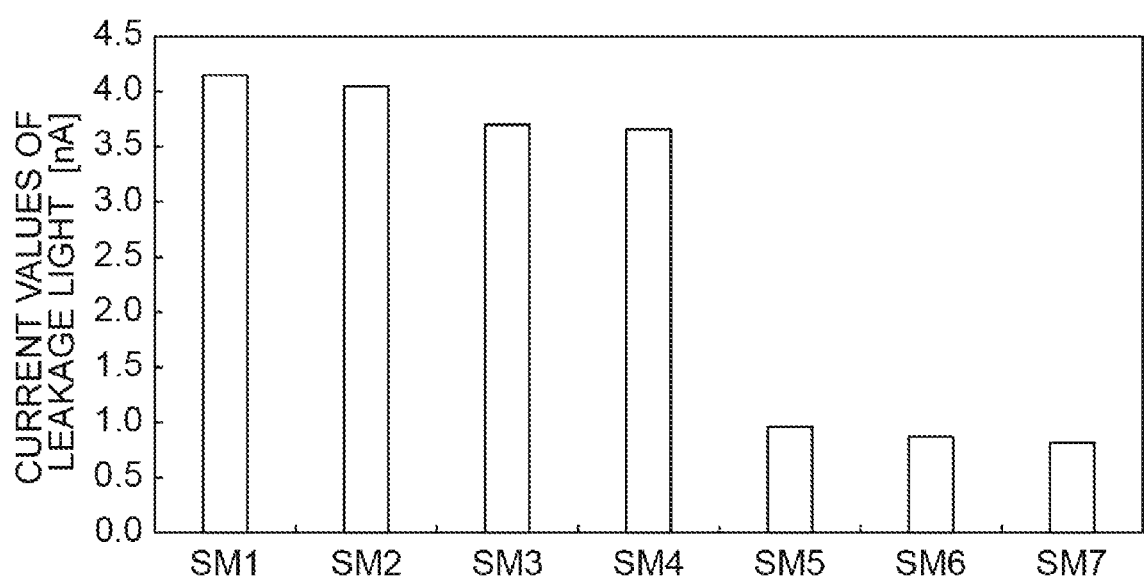
FIG. 7 is a graph showing an example of current values of leakage light measured in seven samples.

FIG. 7 is a graph showing an example of current values of leakage light measured in seven samples. The vertical axis represents the current values of leakage light measured in each sample. The horizontal axis indicates each sample number. The current value of leakage light of sample SM1 was 4.2 nA. The current value of leakage light of sample SM2 was 4.1 nA. The current value of leakage light of sample SM3 was 3.7 nA. The current value of leakage light of sample SM4 was 3.7 nA. The current value of leakage light of sample SM5 was 1.0 nA. The current value of leakage light of sample SM6 was 0.9 nA. The current value of leakage light of sample SM7 was 0.8 nA. As described above, the current values of the leakage light in samples SM5 to SM7 were significantly smaller than the current values of the leakage light in samples SM1 to SM4. Therefore, it can be seen that detection of leakage light can be suppressed by metal pattern layer 117.

(Carrier)

Next, carrier 100b will be described with reference to FIGS. 1, 2, 4 and 6. As shown in FIGS. 1 and 2, carrier 100b includes a support substrate 102 having a third major surface 102s disposed opposite to second major surface 110t, and solder pattern layers 104, 106, 107, 108 provided on third major surface 102s. Support substrate 102 has a fourth major surface 102t opposite to third major surface 102s. Each of third major surface 102s and fourth major surface 102t has, for example, a rectangular shape. Solder pattern layer 104 is joined to metal pattern layer 114. Solder pattern layer 106 is joined to metal pattern layer 116. Solder pattern layer 107 is joined to metal pattern layer 117. Solder pattern layer 108 is joined to metal pattern layer 118. Support substrate 102 is, for example, an aluminum nitride (AlN) substrate. Solder pattern layer 104, 106, 107, 108 include, for example, a gold-tin (AuSn) alloy.

Solder pattern layer 104 extends in the Y-axis direction. Solder pattern layer 104 extends along an edge of third major surface 102s (an edge extending in the Y-axis direction).

Solder pattern layer 106 is spaced apart from solder pattern layer 104 in the X-axis direction. Solder pattern layer 106 includes a pair of first portions 106a and 106b extending along the X-axis direction and a second portion 106c connecting the pair of first portions 106a and 106b. Second portion 106c is spaced apart from solder pattern layer 104 in the X-axis direction and extends in the Y-axis direction. The pair of first portions 106a and 106b have end portions near solder pattern layer 104, and are integrally connected to second portion 106c at the end portions. Thus, solder pattern layer 106 has, for example, a U-shape.

Solder pattern layer 107 includes a first portion 107a and a second portion 107b. First portion 107a and second portion 107b are spaced apart from each other. First portion 107a is disposed between first portion 106a and solder pattern layer 108. Second portion 107b is disposed between first portion 106b and solder pattern layer 108.

Solder pattern layer 108 is spaced apart from solder pattern layer 106 in the X-axis direction. Solder pattern layer 108 is provided on an edge of third major surface 102s (an edge extending in the Y-axis direction and opposite to the edge on which solder pattern layer 104 is provided). Solder pattern layer 108 is situated at the center of the edge of third major surface 102s in the Y-axis direction.

Solder pattern layers 106, 107, 108 may be connected to each other to form a single solder pattern layer. In this case, a region between first portion 106a and first portion 106b may also be covered by the solder pattern layer.

(Overlap between Light Receiving Device and Carrier)

Figure 8:
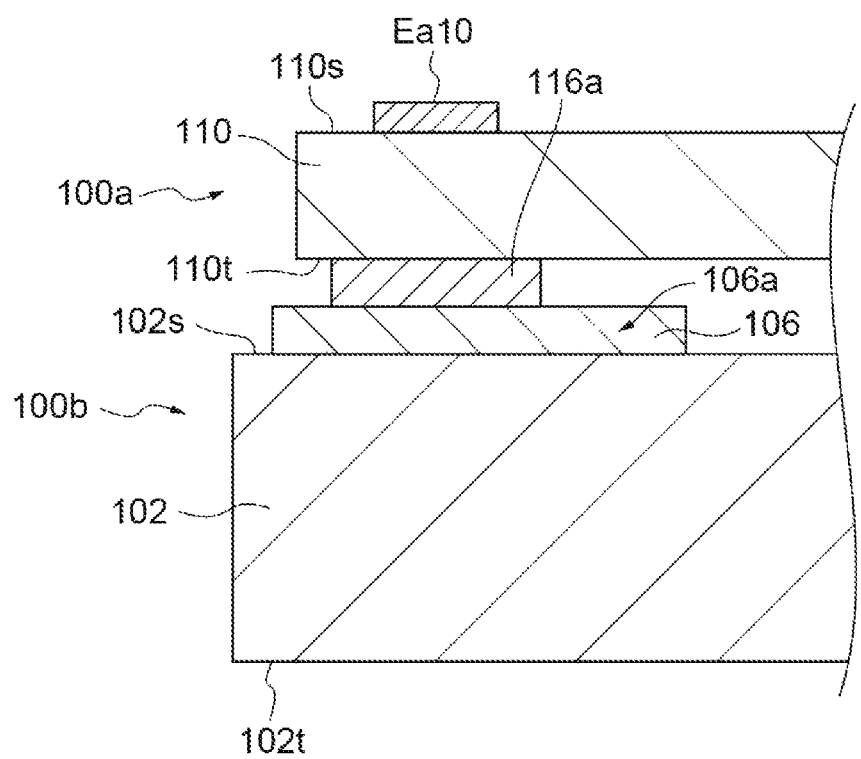
FIG. 8 is a cross-sectional view taken along line VIII-VIII in FIG. 4.

Next, light receiving apparatus 100 seen from the Z-axis direction will be described with reference to FIGS. 4 and 8. FIG. 8 is a cross-sectional view taken along line VIII-VIII in FIG. 4. As shown in FIG. 4, metal pattern layers 114, 116, 117, 118 are situated so as not to overlap optical 90 degree hybrid elements 20a and 20b and optical demultiplexers 52a, 52b, and 52c as seen from the Z-axis direction. As described above, optical 90 degree hybrid elements 20a and 20b include MMI couplers 21a, 22a, 21b, and 22b (FIG. 6). The optical properties of optical demultiplexers and MMI couplers are particularly sensitive to stress. Such an arrangement of the metal pattern layer is effective for avoiding deterioration of optical characteristics of the optical 90 degree hybrid due to stress caused by the metal pattern layer.

Electrode pads Ea10, Ea7, Ea14, Ea12, Ea13, Ea11, Ea8 are sequentially arranged along the X-axis direction. As seen from the Z-axis direction, entire electrode pads Ea10, Ea7, Ea14, Ea12, Ea13, Ea11, Ea8 overlap third portion 116a of metal pattern layer 116. As seen from the Z-axis direction, entire third portion 116a of metal pattern layer 116 overlaps first portion 106a of solder pattern layer 106 (see FIG. 8).

Electrode pads Eb10, Eb7, Eb14, Eb12, Eb13, Eb11, Eb8 are sequentially arranged along the X-axis direction. As seen from the Z-axis direction, entire electrode pads Eb10, Eb7, Eb14, Eb12, Eb13, Eb11, Eb8 overlap third portion 116b of metal pattern layer 116. As seen from the Z-axis direction, entire third portion 116b of metal pattern layer 116 overlaps first portion 106b of solder pattern layer 106.

As seen from the Z-axis direction, entire fourth portion 116c of metal pattern layer 116 overlaps second portion 106c of solder pattern layer 106. Fourth portion 116c of metal pattern layer 116 and second portion 106c of solder pattern layer 106 extend in the Y-axis direction between the plurality of light receiving elements 30a1 to 30a4, 30b1 to 30b4 and optical 90 degree hybrid elements 20a and 20b as seen from the Z-axis direction.

As seen from the Z-axis direction, entire first portion 117a of metal pattern layer 117 overlaps first portion 107a of solder pattern layer 107. As seen from the Z-axis direction, entire second portion 117b of metal pattern layer 117 overlaps second portion 107b of solder pattern layer 107.

As seen from the Z-axis direction, entire solder pattern layer 108 overlaps metal pattern layer 118. Solder pattern layer 108 and metal pattern layer 118 are portions adjacent to input port P2 as seen from the Z-axis direction. Metal pattern layer 118 may be adjacent to input ports P1 and P3 as seen from the Z-axis direction.

Electrode pads Ea15, Ea1, Ea5, Ea2, Ea16, Ea17, Ea3, Ea6, Ea4, Ea18, Eb15, Eb1, Eby, Eb2, Eb16, Eb17, Eb3, Eb6, Eb4, Eb18 are sequentially arranged along the X-axis direction. As seen from the Z-axis direction, entire electrode pads Ea1 to Ea6, Ea15 to Ea18, Ebb to Eb6, and Eb15 to Eb18 overlap metal pattern layer 114. As seen from the Z-axis direction, entire metal pattern layer 114 overlaps solder pattern layer 104.

(Devices Integrated on First Major Surface of Light Receiving Device)

Figure 9:
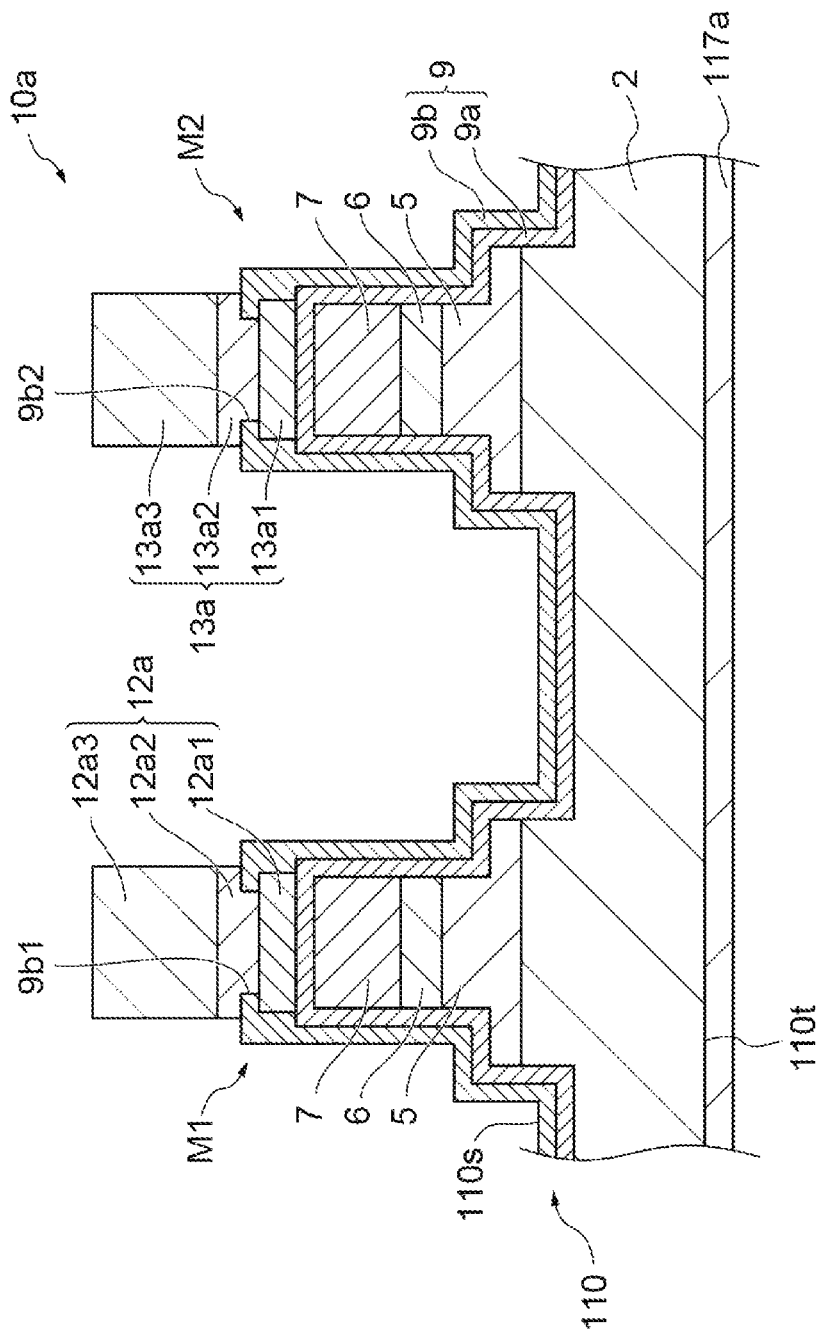
FIG. 9 is a cross-sectional view taken along line IX-IX in FIG. 3.

FIG. 9 is a cross-sectional view taken along line IX-IX in FIG. 3. As shown in FIG. 9, variable optical attenuator 10a includes a pair of mesas M1 and M2 provided on a substrate 2. Each mesa M1, M2 extends along an optical waveguide. Mesa M1 is heated by heater 12a, and mesa M2 is heated by heater 13a. In an embodiment of the present disclosure, the power supplied to heater 13a is greater than the power supplied to heater 12a. Variable optical attenuator 10a can be operated by controlling the electric power supplied to heaters 12a and 13a.

Each mesa M1, M2 includes a cladding layer 5, a core layer 6 and a cladding layer 7. Cladding layer 5 is provided on substrate 2. Core layer 6 is provided on cladding layer 5. Cladding layer 7 is provided on core layer 6.

Substrate 2 is a semi-insulating group III-V compound semiconductor substrate such as a semi-insulating InP substrate. Cladding layer 5 is an n-type III-V compound semiconductor layer such as n-InP layer. Core layer 6 is a III-V compound semiconductor layer such as i-gallium indium arsenide phosphide (GaInAsP) layer. Cladding layer 7 is an i-type III-V compound semiconductor layer such as i-InP layer.

Heater 12a includes a plurality of metal layers 12a1, 12a2, and 12a3 sequentially provided on the top surface of mesa M1. Metal layer 12a1 is, for example, a Ti layer. Metal layer 12a2 is, for example, a titanium tungsten (TiW) layer. Metal layer 12a3 is, for example, an Au plating layer. Heater 13a includes a plurality of metal layers 13a1, 13a2, and 13a3 sequentially provided on the top surface of mesa M2. Metal layer 13a1 is, for example, a Ti layer. Metal layer 13a2 is, for example, a TiW layer. Metal layer 13a3 is, for example, an Au plating layer.

Variable optical attenuator 10a includes an insulating film 9 that covers mesas M1 and M2. Insulating film 9 includes a first insulating film 9a covering mesas M1 and M2, and a second insulating film 9b provided on first insulating film 9a. First insulating film 9a is, for example, a silicon nitride film. Second insulating film 9b is, for example, a silicon oxynitride film. Second insulating film 9b has an opening 9b1 provided on the top surface of mesa M1 and an opening 9b2 provided on the top surface of mesa M2. In the embodiment of the present disclosure, opening 9b1 is provided on metal layer 12a1, and metal layer 12a2 is buried in opening 9b1. Similarly, opening 9b2 is provided on metal layer 13a1, and metal layer 13a2 is buried in opening 9b2.

Variable optical attenuator 10b has the same configuration as that of variable optical attenuator 10a. Optical demultiplexers 50a, 50b, 51a, 51b, 52a, 52b, and 52c and optical 90 degree hybrid elements 20a and 20b have a mesa, like mesas M1 and M2, including cladding layer 5, core layer 6, and cladding layer 7.

Figure 10:
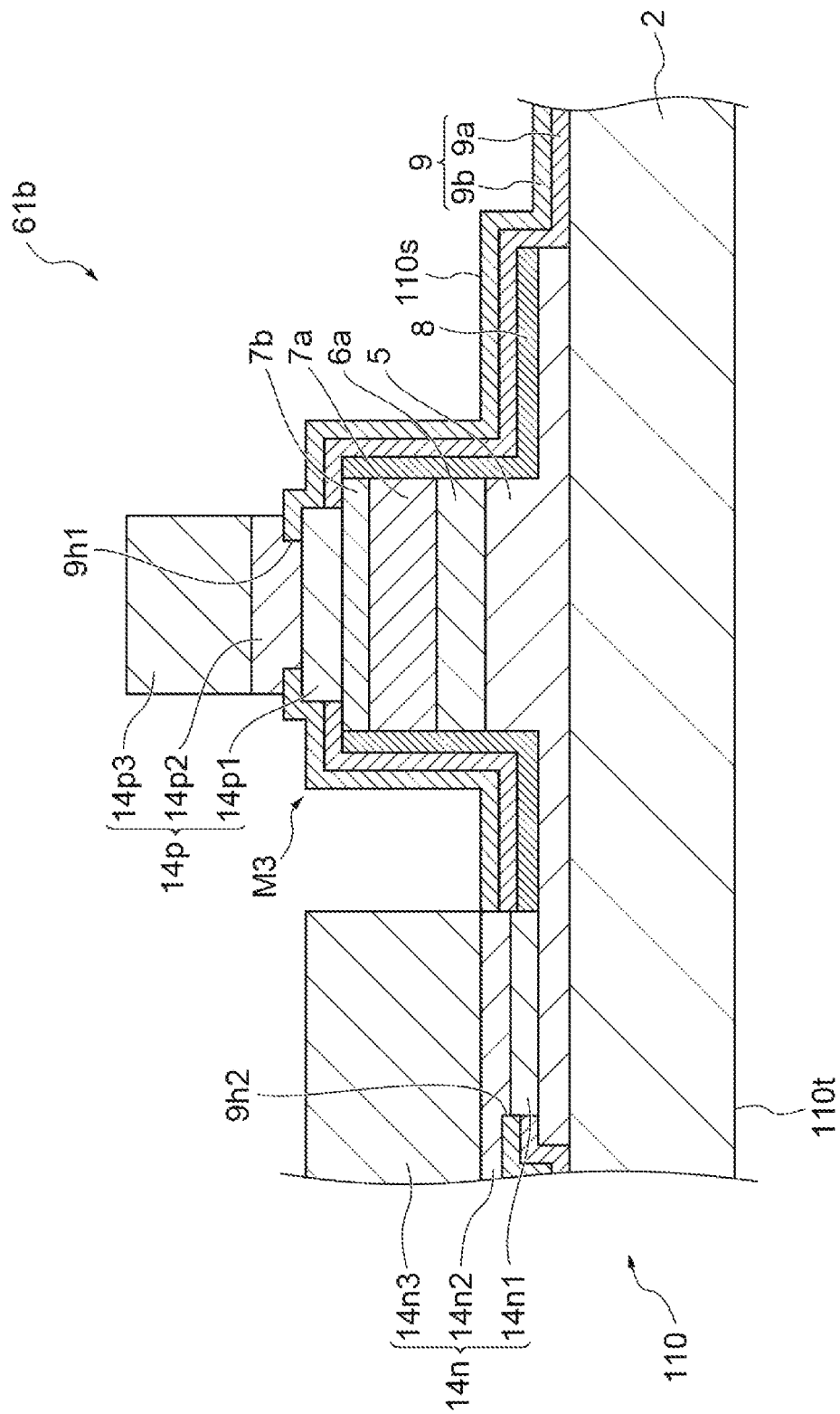
FIG. 10 is a cross-sectional view taken along line X-X in FIG. 3.

FIG. 10 is a cross-sectional view taken along line X-X in FIG. 3. As shown in FIG. 10, light receiving element 61b includes a mesa M3 provided on substrate 2. Mesa M3 includes cladding layer 5, a light absorbing layer 6a, a cladding layer 7a, and a p-type contact layer 7b. Cladding layer 5 is provided on substrate 2. Light absorbing layer 6a is provided on cladding layer 5. Cladding layer 7a is provided on light absorbing layer 6a. P-type contact layer 7b is provided on cladding layer 7a. The side surface of mesa M3 is covered with a III-V compound semiconductor layer 8. III-V compound semiconductor layer 8 may include indium phosphide doped with iron. III-V compound semiconductor layer 8 can reduce the dark current.

In light receiving element 61b, cladding layer 5 also functions as an n-type contact layer. Light absorbing layer 6a is a III-V compound semiconductor layer such as i-gallium indium arsenide (GaInAs) layer. Cladding layer 7a is a p-type III-V compound semiconductor layer such as p-InP layer. P-type contact layer 7b is a p-type III-V compound semiconductor layer such as p-GaInAs.

Light receiving element 61b includes a first electrode 14p connected to p-type contact layer 7b and a second electrode 14n connected to cladding layer 5. First electrode 14p includes a plurality of metal layers 14p1, 14p2, and 14p3 sequentially provided on the top surface of mesa M3. Metal layer 14p1 is, for example, an ohmic layer. Metal layer 14p2 is, for example, a TiW layer. Metal layer 14p3 is, for example, an Au plating layer. Second electrode 14n includes a plurality of metal layers 14n1, 14n2, and 14n3 sequentially provided on cladding layer 5 adjacent to mesa M3. Metal layer 14n1 is, for example, an ohmic layer. Metal layer 14n2 is, for example, a TiW layer. Metal layer 14n3 is, for example, an Au plating layer.

Mesa M3 is covered by insulating film 9. Insulating film 9 includes first insulating film 9a covering mesa M3 and second insulating film 9b provided on first insulating film 9a. Insulating film 9 has an opening 9h1 provided on the top surface of mesa M3 and an opening 9h2 provided on cladding layer 5 adjacent to mesa M3. In the embodiment of the present disclosure, opening 9h1 is provided on metal layer 14p1, and metal layer 14p2 is buried in opening 9h1. Metal layers 14n1 and 14n2 are buried in opening 9h2.

Other light receiving elements 30a1 to 30a4, 30b1 to 30b4, 60a, 60b, and 61a also have the same configuration as light receiving element 61b.

(Manufacturing Method of Light Receiving Apparatus)

Light receiving apparatus 100 is manufactured as follows. First, light receiving device 100a and carrier 100b are prepared. Next, solder pattern layers 104, 106, 107, 108 are melted by heating carrier 100b. In a state in which solder pattern layers 104, 106, 107, 108 are melted, metal pattern layers 114, 116, 117, 118 of light receiving device 100a are bonded to solder pattern layers 104, 106, 107, 108, respectively.

A method of manufacturing light receiving device 100a will be described mainly with reference to FIGS. 9 to 16. Light receiving device 100a is manufactured, for example, as follows.

Figure 11:
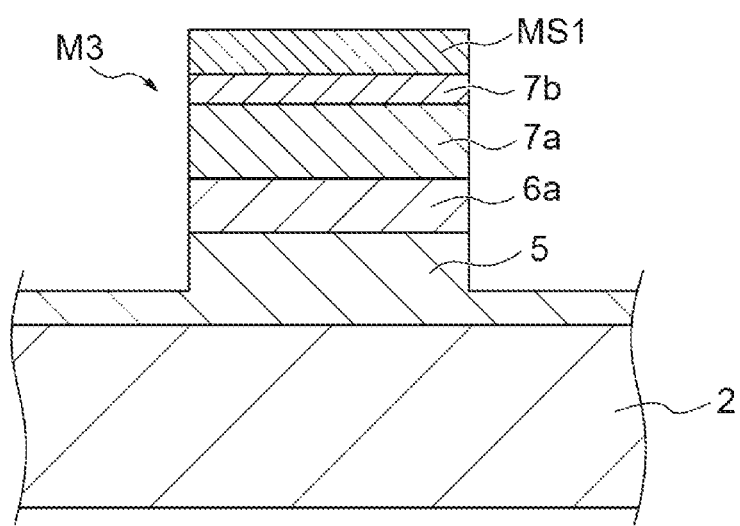
FIG. 11 is a cross-sectional view illustrating a step in a method of manufacturing a light receiving device.

First, cladding layer 5, light absorbing layer 6a, cladding layer 7a, and p-type contact layer 7b are sequentially grown on substrate 2 by organometallic vapor phase epitaxy (OMVPE) or the like (see FIG. 11).

Next, an insulating film (for example, 200 nm thick) such as a silicon nitride film is deposited on p-type contact layer 7b by chemical vapor deposition (CVD) or the like, and then masks for butt-joint are formed by photolithography and etching (for example, wet etching using buffered hydrofluoric acid). The butt-joint masks are formed in regions BJ60a, BJ61a, BJ60b, BJ61b, and BJ30 (see FIG. 6). Subsequently, light absorbing layer 6a, cladding layer 7a and p-type contact layer 7b are etched by wet etching using, for example, a hydrogen chloride (HCl)-based or hydrogen bromide (HBr)-based etchant. When light absorbing layer 6a is etched, cladding layer 5 functions as an etching stop layer.

Figure 12:
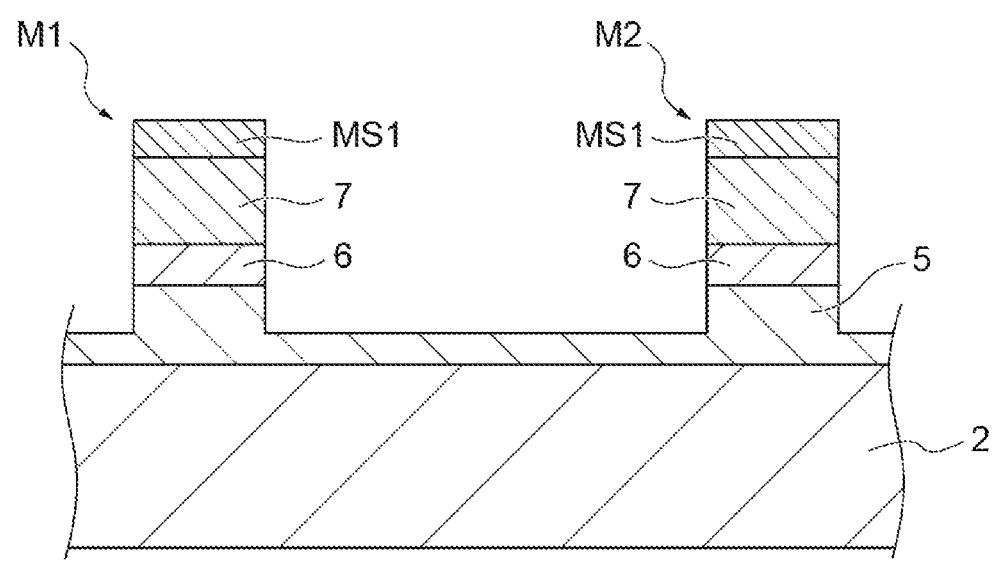
FIG. 12 is a cross-sectional view illustrating a step in a method of manufacturing a light receiving device.
Figure 13:
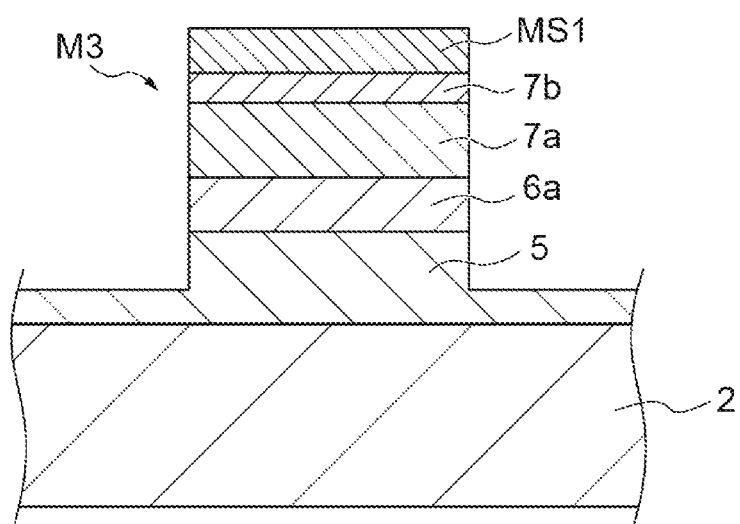
FIG. 13 is a cross-sectional view illustrating a step in a method of manufacturing a light receiving device.
Figure 14:
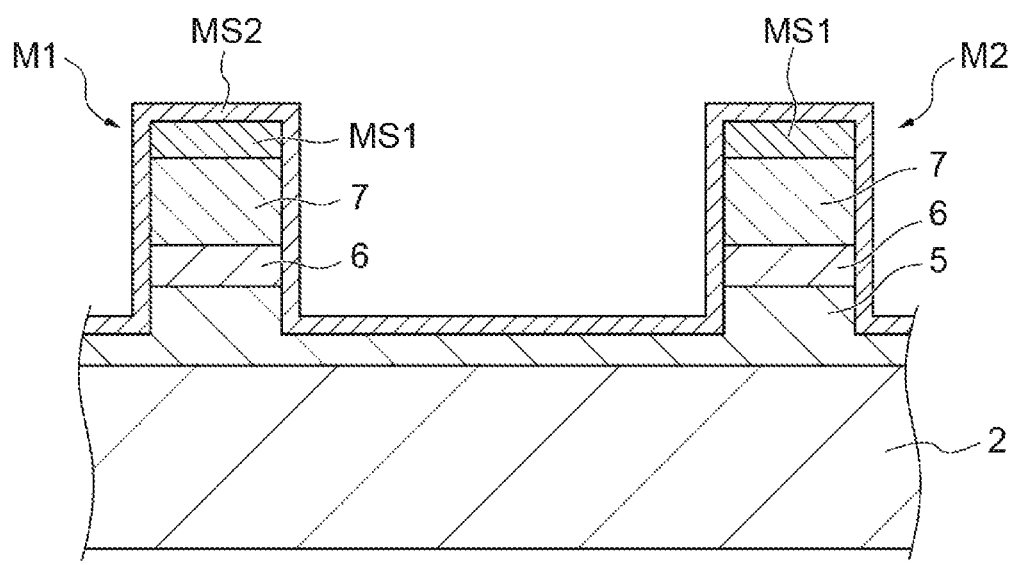
FIG. 14 is a cross-sectional view illustrating a step in a method of manufacturing a light receiving device.
Figure 15:
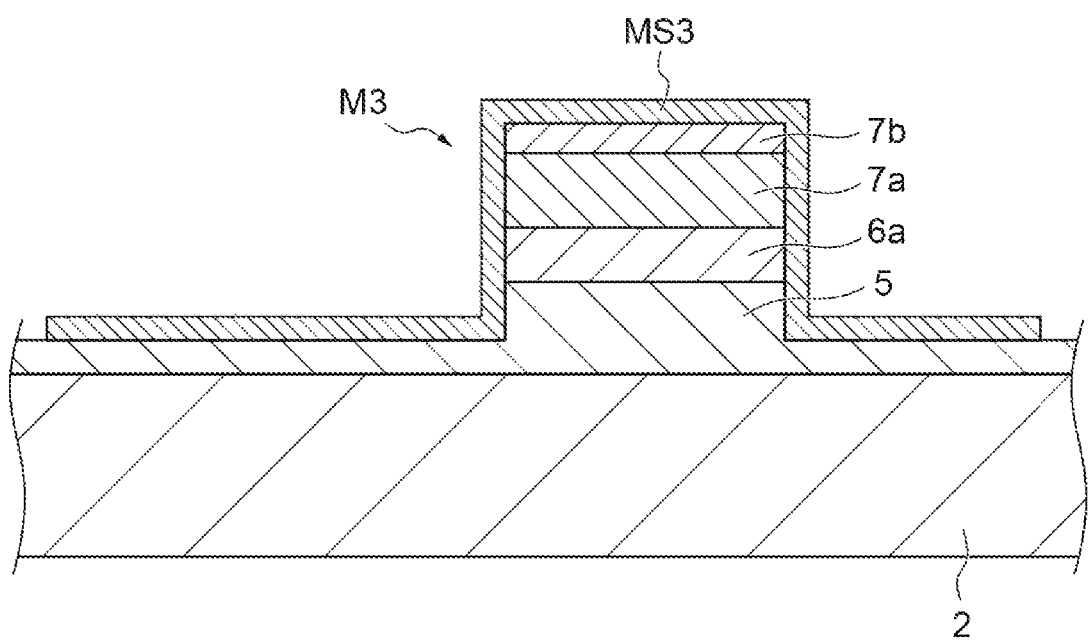
FIG. 15 is a cross-sectional view illustrating a step in a method of manufacturing a light receiving device.
Figure 16:
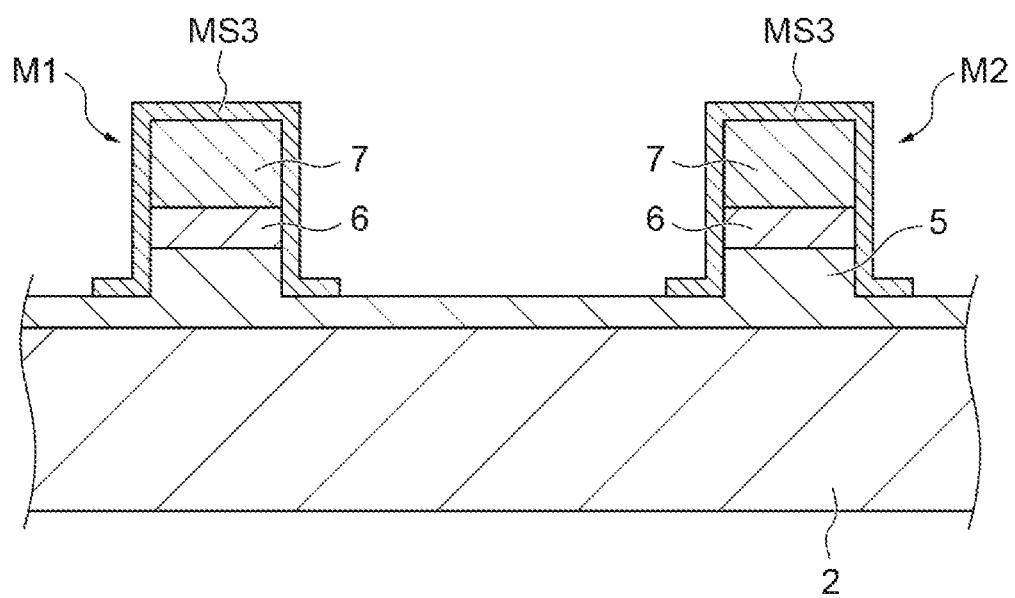
FIG. 16 is a cross-sectional view illustrating a step in a method of manufacturing a light receiving device.

Next, using butt-joint masks, core layer 6 and cladding layer 7 are selectively grown on cladding layer 5 by organometallic vapor phase epitaxy or the like (see FIG. 12). Thus, butt-joint bondings are formed at the edges of regions BJ60a, BJ61a, BJ60b, BJ61b, and BJ30. Thereafter, the butt-joint masks are removed.

Next, an insulating film (for example, 300 nm thick) such as a silicon nitride film or a silicon oxide film is deposited on cladding layer 7 and p-type contact layer 7b, and then a resist pattern for forming mesas such as mesas M1, M2, and M3 is formed by photolithography. Using the resist pattern, the insulating film is etched by reactive ion etching (RIE) using, for example, tetrafluoromethane ($CF_4$) to form a first insulating mask MS1 (see FIGS. 11 and 12). Using first insulating mask MS1, cladding layer 5, light absorbing layer 6a, cladding layer 7a, p-type contact layer 7b, core layer 6, and cladding layer 7 are etched by reactive ion etching using a chlorine-based gas, for example. As a result, mesas such as mesas M1, M2, M3 are formed. In this manner, mesas included in variable optical attenuators 10a and 10b, optical 90 degree hybrid elements 20a and 20b, optical demultiplexers 50a, 50b, 51a, 51b, 52a, 52b, and 52c, the optical waveguides, and light receiving elements 30a1 to 30a4, 30b1 to 30b4, 60a, 60b, 61a, and 61b are formed. An unnecessary portion of first insulating mask MS1 provided on the terrace is removed by photolithography and wet etching (etching using an etchant such as buffered hydrofluoric acid). The terrace is a portion having the same height as the mesa.

Next, an insulating film (for example, 100 nm thick) such as a silicon nitride film is deposited on the mesa and first insulating mask MS1, and then a resist pattern is formed to cover the mesas (mesas M1, M2, etc.) other than spot size converters 40a, 40b, 40c and light receiving elements 30a1 to 30a4, 30b1 to 30b4, 60a, 60b, 61a, 61b. Using the resist pattern, the insulating film is etched by wet etching (etching using an etchant such as buffered hydrofluoric acid) to form a second insulating mask MS2 covering the mesas (mesas M1, M2, etc.) other than the spot size converter and the light receiving element (see FIGS. 13 and 14). Second insulating mask MS2 is not formed on mesa M3. Thereafter, the damaged layer formed by the dry etching is removed by wet etching using an HCl-based etchant.

Next, using first insulating mask MS1 and second insulating mask MS2, III-V compound semiconductor layer 8 is formed on the sides of the mesas (mesa M3 or the like) included in spot size converters 40a, 40b, and 40c and light receiving elements 30a1 to 30a4, 30b1 to 30b4, 60a, 61a, and 61b by organometallic vapor phase epitaxy or the like (see FIG. 10). Subsequently, first insulating mask MS1 and second insulating mask MS2 are removed by wet etching using buffered hydrofluoric acid.

Next, an insulating film (for example, 300 nm thick) such as a silicon nitride film is deposited on cladding layer 5, and then a resist pattern having openings between adjacent light receiving elements is formed by photolithography. Using the resist pattern, the insulating film is etched by, for example, reactive ion etching using CF 4 to form a third insulating mask MS3 having openings between adjacent light receiving elements (see FIGS. 15 and 16). Using third insulating mask MS3, cladding layer 5 is removed by reactive ion etching using, for example, a chlorine-based gas. Thereby, cladding layer 5 between the adjacent light receiving elements is removed, so that the adjacent light receiving elements are separated from each other. At the same time, cladding layer 5 is also removed between mesa M1 and mesa M2 (see FIG. 9). Subsequently, third insulating mask MS3 is removed.

Next, in variable optical attenuators 10a and 10b, first insulating film 9a such as a silicon nitride film is formed on mesas M1 and M2 and substrate 2, and then metal layer 12a1 is formed on mesa M1 and metal layer 13a1 is formed on mesa M2 by a lift-off method using a resist pattern having openings on top surfaces of mesas M1 and M2 (see FIG. 9).

Next, after first insulating film 9a is opened in light receiving elements 30a1 to 30a4, 30b1 to 30b4, 60a, 60b, 61a, and 61b, metal layer 14p1 is formed on mesa M3 and metal layer 14n1 is formed adjacent to mesa M3 using a lift-off method (see FIG. 10).

Next, after second insulating film 9b such as a silicon nitride film or a silicon oxynitride film is deposited, a resist pattern having openings on metal layers 12a1, 13a1, 14p1, and 14n1 is formed by photolithography. Second insulating film 9b is etched using the resist pattern to form openings 9b1, 9b2, 9h1, and 9h2 (see FIGS. 9 and 10).

Next, a first resist pattern having openings larger than openings 9b1, 9b2, 9h1, and 9h2 is formed by photolithography, and then metal layers 12a2, 13a2, 14p2, and 14n2 are deposited by sputtering (see FIGS. 9 and 10). Thereafter, a second resist pattern having similar openings is formed, and then metal layers 12a3, 13a3, 14p3, and 14n3 are deposited by plating. After the second resist pattern is removed, unnecessary metal layers 12a2, 13a2, 14p2, and 14n2 are removed by reactive ion etching using, for example, sulfurhexafluoride ($SF_6$). Thereafter, the first resist pattern is removed by oxygen ashing or the like.

Next, second major surface 110t of semiconductor substrate 110 is polished to thin semiconductor substrate 110. Thereafter, a metal film is formed on semiconductor substrate 110 by plating, for example. The metal film includes, for example, a Ti base layer and an Au plating layer. Thereafter, the metal film is etched by photolithography to form metal pattern layers 114, 116, 117, 118 (see FIGS. 3 and 5).

Although preferred embodiments of the present disclosure have been described in detail above, the present disclosure is not limited to the above embodiments.

The embodiments disclosed herein are to be considered in all respects as illustrative and not restrictive. The scope of the present invention is defined not by the above-described meaning but by the scope of claims, and is intended to include meanings equivalent to the scope of claims and all modifications within the scope.

What is claimed is:

1. A light receiving device comprising:
   a semiconductor substrate having a first major surface and a second major surface opposite to the first major surface; and
   a metal pattern layer provided directly on the second major surface,
   wherein the first major surface is provided with a first input port configured to receive an input of signal light, a second input port configured to receive an input of local oscillation light, a first light receiving element optically coupled to the first input port, an optical 90 degree hybrid element optically coupled to the first input port and the second input port, and a second light receiving element optically coupled to the optical 90 degree hybrid element, and wherein the metal pattern layer contains at least one of titanium or chromium.

2. The light receiving device according to claim 1, wherein the metal pattern layer includes a portion between the first light receiving element and the second input port as seen from a direction normal to the first major surface.

3. The light receiving device according to claim 2, the portion overlaps a line segment connecting the first light receiving element and the second input port as seen from the direction.

4. The light receiving device according to claim 1, wherein the metal pattern layer includes a first layer and a second layer, wherein the first layer is disposed between the second layer and the semiconductor substrate, wherein the first layer contains at least one of titanium or chromium, and wherein the second layer contains gold.

5. The light receiving device according to claim 1, wherein the metal pattern layer is situated so as not to overlap the optical 90 degree hybrid element as seen from a direction normal to the first major surface.

6. The light receiving device according to claim 1, wherein the second major surface has an uneven region.

7. The light receiving device according to claim 6, wherein the metal pattern layer includes a portion on the uneven region.

8. The light receiving device according to claim 1, wherein the first major surface is provided with a variable optical attenuator optically coupled to the first input port and the optical 90 degree hybrid element.

9. The light receiving device according to claim 8, wherein the metal pattern layer is situated to overlap the variable optical attenuator as seen from a direction normal to the first major surface.

10. The light receiving device according to claim 1, wherein the first major surface is provided with at least one optical demultiplexer optically coupled to the first input port and the optical 90 degree hybrid element.

11. The light receiving device according to claim 10, wherein the metal pattern layer is situated to overlap the at least one optical demultiplexer as seen from a direction normal to the first major surface.

12. The light receiving device according to claim 11, wherein the at least one optical demultiplexer comprises a first optical demultiplexer and a second optical demultiplexer, wherein the first optical demultiplexer is disposed between the first input port and the second optical demultiplexer, wherein the first optical demultiplexer is optically coupled to the first light receiving element.

13. The light receiving device according to claim 12, wherein the first major surface is provided with a variable optical attenuator optically coupled to the first input port and the optical 90 degree hybrid element, wherein the second optical demultiplexer is optically coupled to the variable optical attenuator.

14. A light receiving apparatus comprising:

the light receiving device according to claim 1; and a carrier including a support substrate having a third major surface disposed so as to oppose the second major surface, and a solder pattern layer provided on the third major surface and joined to the metal pattern layer.

15. The light receiving device according to claim 1, wherein the first input port, the second input port, the first light receiving element, the second light receiving element and the optical 90 degree hybrid element are monolithically integrated on the first major surface.

16. The light receiving device according to claim 1, wherein the first light receiving element is not optically coupled to the optical 90 degree hybrid element.

17. The light receiving device according to claim 1, wherein the first light receiving element is optically coupled to the first input port via an optical waveguide and a variable optical attenuator.

18. The light receiving device according to claim 1, wherein the semiconductor substrate is a III-V compound semiconductor substrate, and the first light receiving element comprises a III-V compound semiconductor layer.

* * * * *